F. BROWN.
CORN HARVESTER.
APPLICATION FILED JULY 31, 1913.

1,121,895.

Patented Dec. 22, 1914.
2 SHEETS—SHEET 1.

Witnesses
Geo. E. Frech.
E. G. McCarthy.

Inventor
Fred Brown

By

Attorney

F. BROWN.
CORN HARVESTER.
APPLICATION FILED JULY 31, 1913.

1,121,895.

Patented Dec. 22, 1914.
2 SHEETS—SHEET 2.

Witnesses
Geo. E. Frech.
P. H. Ross

Inventor
Fred Brown

By

Attorney

UNITED STATES PATENT OFFICE.

FRED BROWN, OF MARSHALLTOWN, IOWA.

CORN-HARVESTER.

1,121,895.  Specification of Letters Patent.  Patented Dec. 22, 1914.

Application filed July 31, 1913. Serial No. 782,296.

*To all whom it may concern:*

Be it known that I, FRED BROWN, a citizen of the United States, residing at Marshalltown, in the county of Marshall and State of Iowa, have invented new and useful Improvements in Corn-Harvesters, of which the following is a specification.

The present invention relates to means for removing the ears from the stalks of standing corn.

The primary object is to provide simple and practical mechanism, which will effectively detach the ears without materially shelling the corn from the cobs, and which moreover will eliminate the necessity of positively gripping the stalks during the ordinary snapping operation, thereby overcoming the difficulty of breaking the stalks when the machine is traveling over rough ground, or is being subjected to considerable jar and vibration.

An embodiment of the invention is illustrated in the accompanying drawings, but it will be obvious from an inspection of the claims hereto appended, that the invention is not limited to the exact structure disclosed.

Figure 1:
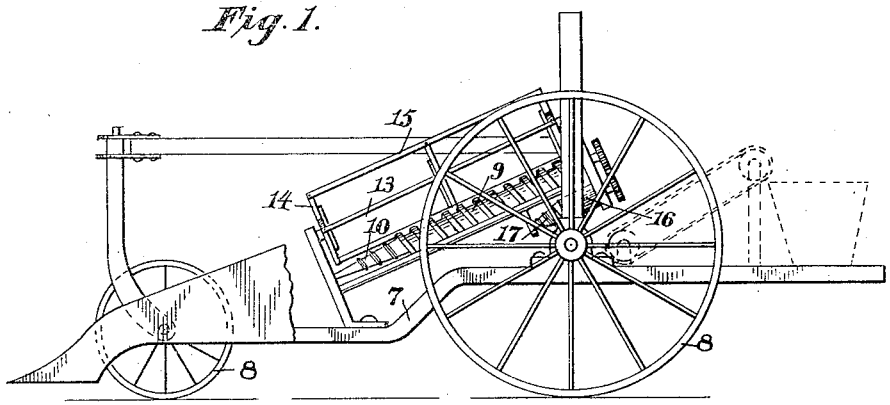
Figure 2:
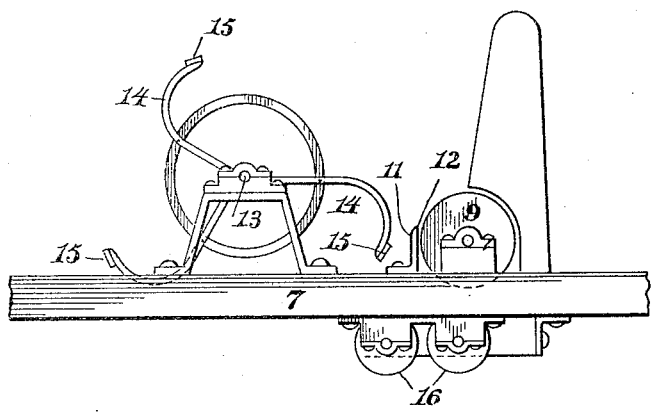
Figure 3:
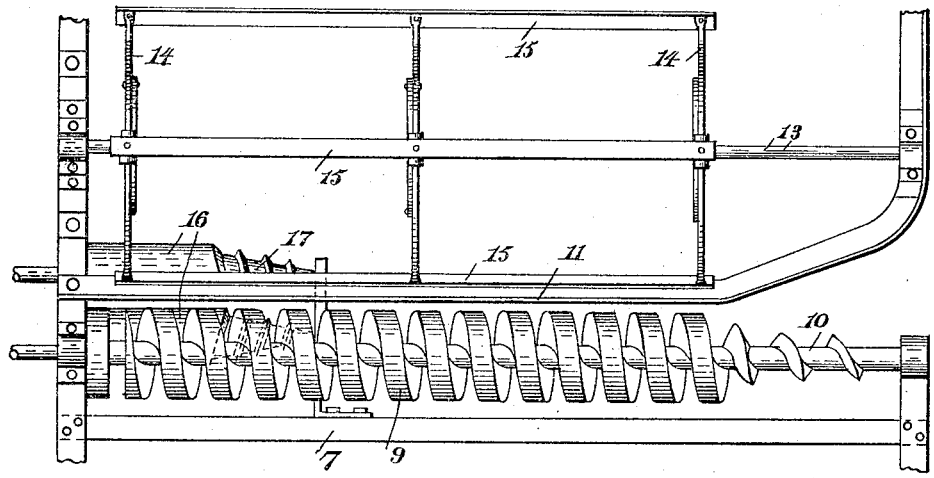
Figure 4:
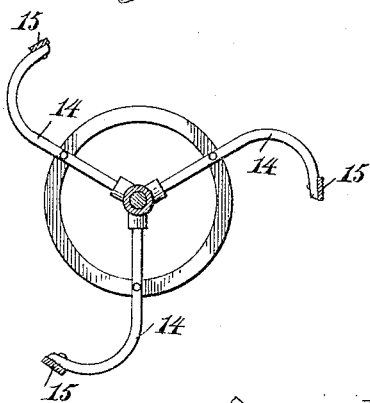
Figure 5:
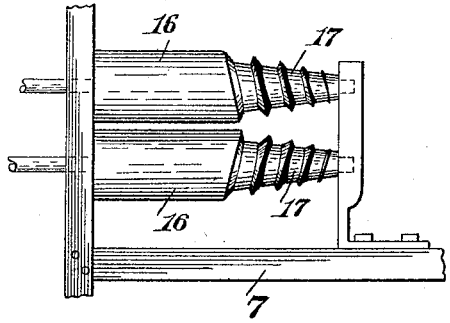
Figure 6:
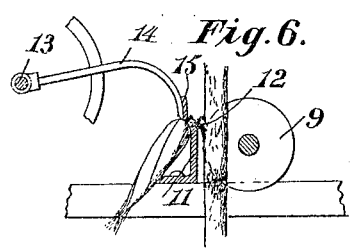

In the drawings: Figure 1 is a view in elevation, and diagrammatic in its character, illustrating the improved snapping mechanism. Fig. 2 is an end view of such mechanism. Fig. 3 is a plan view thereof. Fig. 4 is a cross sectional view through the snapping drum. Fig. 5 is a plan view of the stalk-gripping rolls. Fig. 6 is a detail sectional view illustrating the manner in which an ear is detached from the stalk.

Similar reference numerals designate corresponding parts in all the figures of the drawings.

In the embodiment illustrated, a suitable supporting frame 7 is employed mounted on wheels 8. In so far as the supporting mechanism is concerned, the machine may be of any desired type, and the driving means may be arranged in any convenient manner, the invention herein residing more particularly in the ear-snapping mechanism.

On the supporting frame is suitably journaled stalk-directing means 9, which is preferably in the form of a screw set at a forward and downward inclination and rotated in any suitable manner. This screw preferably has its front end tapered, as illustrated at 10. Located alongside the same and longitudinally thereof, is a fixed snapping bar 11, preferably formed of angle iron, and having an upstanding or forwardly projecting edge 12, which is preferably beveled. On the side of the snapping bar 11, opposite to the stalk-directing screw 9, is a rotary snapping drum, comprising a shaft 13 suitably journaled on the frame, and having a plurality of radially disposed spider arms 14. Secured to the outer free ends of the arms 14, are bars 15, which are disposed longitudinally of the snapping bar 11, and are spaced apart so that they will consecutively pass in a direction transversely of said bar 11. There is preferably located below or behind the rear or upper end of the stalk-directing screw 9, a pair of stalk-gripping rollers 16 having their front ends formed with tapered screws 17. The stalk-directing screw 9, the snapping drum, and the gripping rollers 16, are rotated by any suitable means in the proper directions.

Briefly described, the operation is as follows: The machine is caused by any suitable power to move longitudinally of a row of standing corn, and the stalks of said corn are caused to pass between the screw 9 and the bar 11. The rotation of said screw effects the positive rearward movement of the stalk. When, however, the butt of an ear is brought against the screw 9, the rounded face of the same forces the ear against the snapping bar 11 and tips said ear over the bar and into the path of movement of the bars 15. The ears of course cannot pass through the space between the screw and the bar 11. As the drum is revolving, one of its bars 15 will thus engage the ear, and swing it downwardly. This causes the shank of the ear to break over the bar 11, as indicated in Fig. 6, and the ear will thus be severed from the stalk. In this connection, it may be stated that the screw 9 should be set as close as possible to the bar 11, though it should not rub or touch the latter, and the snapping drum can be adjustably mounted so as to be moved toward or from the bar 9 and set at an inclination or in slanting relation thereto. Should a stalk, for any reason, become broken, it will be caused to move rearwardly until the lower broken end thereof is engaged by the gripping rolls 16, whereupon it will be pulled downwardly, and if there is an ear thereon, it will be held with sufficient firmness until the ear is broken off in the manner above described. With this mechanism therefore, it will be seen, first that there is no straight pull upon the ear, for the purpose of snapping it from the stalk and danger of breaking the stalk is to a material degree avoided. Moreover, the stalks are at all times free so that the movement of the machine over rough ground or its vibration from any cause will not affect its proper operation. Furthermore, there is less danger of shelling the corn by a breaking movement of the kind described, than if there is a straight pull, in which the pressure comes against the lower portion of the ear.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. In a corn harvester, the combination with a snapping member, of means for directing stalks along one side of the same, and means on the opposite side of the snapping member for bending the shanks of the ears over the said member to sever said ears from the stalks.

2. In a corn harvester, the combination with a snapping member, of stalk-directing means on one side of the snapping member, and means on the opposite side of the snapping member for bending the shanks of the ears over said member to sever them from the stalks.

3. In a corn harvester, the combination with a snapping bar, of means for directing stalks along one side of the bar, and means operating on the opposite side of the bar for bending the shanks of the ears over said bar to sever said ears from the stalks.

4. In a corn harvester, the combination with a snapping bar, of means for directing stalks along one side of the bar, and a rotary drum journaled on the opposite side of the bar and operating transversely thereof to bend the shanks of the ears over said bar and break the same from the stalks.

5. In a corn harvester, the combination with a snapping bar, of a rotary stalk-directing roller disposed longitudinally along one side of the bar, and means operating transversely of the bar and located on the opposite side thereof for bending the shanks of the ears downwardly over said bar to break the same from the stalks.

6. In a corn harvester, the combination with a snapping bar, of a rotary roller disposed longitudinally along one side of the bar and having means for directing stalks alongside said bar, and a rotary drum journaled on the opposite side of the bar and having spaced ear-engaging bars that bend the shanks of the ears over the snapping bar to break the same from the stalks.

7. In a corn harvester, the combination with a stalk-directing roller, of a fixed snapping bar located longitudinally alongside the same, and a rotary drum located on the opposite side of the bar to the roller and having spaced bars disposed longitudinally of the snapping bar and operating transversely thereof in close proximity thereto, said bars bending the shanks of the ears over the snapping bar to cause said shanks to break.

8. In a corn harvester, the combination with a supporting frame, of a rotary stalk-directing screw journaled thereon, a fixed snapping bar located longitudinally alongside the screw, and a rotary drum journaled on the frame on the side of the snapping bar opposite to the screw, said drum being provided with a plurality of spaced ear-engaging bars located longitudinally of the snapping bar and moving downwardly transversely thereof and in close proximity thereto.

9. In a corn harvester, the combination with a supporting frame, of a stalk directing screw journaled thereon, a fixed snapping bar located alongside the screw, a rotary snapping drum journaled on the frame on the side of the snapping bar opposite the screw and having spaced bars that move downwardly in close proximity to the snapping bar, and coacting stalk-gripping rollers located beneath the rear portion of the screw and having tapered screw ends.

In testimony whereof I have hereunto set my hand in presence of two subscribing witnesses.

FRED BROWN.

Witnesses:
EMIL F. RADLAPP,
JAY S. LAMBERT.

Copies of this patent may be obtained for five cents each, by addressing the "Commissioner of Patents, Washington, D. C."